(12) United States Patent
McNeilus et al.

(10) Patent No.: US 11,590,938 B2
(45) Date of Patent: *Feb. 28, 2023

(54) ONBOARD WASH SYSTEM

(71) Applicant: Con-Tech Manufacturing, Inc., Dodge Center, MN (US)

(72) Inventors: Grant McNeilus, Dodge Center, MN (US); Brian Meldahl, Brownsdale, MN (US); Daniel Welsh, Claremont, MN (US); James Cunningham, Rochester, MN (US)

(73) Assignee: Con-Tech Manufacturing, Inc., Dodge Center, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/157,960

(22) Filed: Jan. 25, 2021

(65) Prior Publication Data
US 2021/0146888 A1 May 20, 2021

Related U.S. Application Data

(63) Continuation of application No. 15/874,588, filed on Jan. 18, 2018, now Pat. No. 10,899,318.
(Continued)

(51) Int. Cl.
*B08B 3/02* (2006.01)
*B60S 1/64* (2006.01)
(Continued)

(52) U.S. Cl.
CPC ............... *B60S 1/64* (2013.01); *B08B 3/026* (2013.01); *B08B 3/04* (2013.01); *B08B 9/00* (2013.01);
(Continued)

(58) Field of Classification Search
None
See application file for complete search history.

(56) References Cited

U.S. PATENT DOCUMENTS 2,413,488 A * 12/1946 Draeger ................ B28C 5/4231
239/533.13
6,039,468 A 3/2000 Kowalcyzk
(Continued)

FOREIGN PATENT DOCUMENTS

JP 2005319693 A 11/2005
JP 2014184779 A * 10/2014 ........... B08B 9/0813

*Primary Examiner* — Cristi J Tate-Sims
(74) *Attorney, Agent, or Firm* — Larkin Hoffman Daly & Lindgren, Ltd.; Craig J. Lervick

(57) ABSTRACT

An onboard washing system provides the ability to wash specific areas at the rear of a concrete truck, without requiring an operator to climb a ladder or climb on the truck. Certain specified areas which are traditionally difficult to wash, including the inside of the charge hopper, the interior portions of the discharge chute, and rear portions of the mixing drum structure, can now be washed in an automated and efficient manner. The truck-mounted washing system has components which are specifically positioned to cause washing fluid (water) to be sprayed or directed toward predetermined areas in an efficient and effective manner. The system also includes hand-held washing wands or washing mechanisms, which allow an operator to easily reach additional zones or additional areas at the rear of the truck, which are lower. Most significantly, the truck-mounted wash systems and the hand-held nozzle systems (wand) are all operable while an operator remains on the ground.

14 Claims, 8 Drawing Sheets

Related U.S. Application Data

(60) Provisional application No. 62/501,927, filed on May 5, 2017, provisional application No. 62/456,460, filed on Feb. 8, 2017.

(51) Int. Cl.

| | | |
|---|---|---|
| *B60P 3/16* | (2006.01) | |
| *B08B 3/04* | (2006.01) | |
| *B60S 3/00* | (2006.01) | |
| *B08B 13/00* | (2006.01) | |
| *B08B 9/093* | (2006.01) | |
| *B28C 5/42* | (2006.01) | |
| *B08B 9/00* | (2006.01) | |
| *B60S 1/62* | (2006.01) | |

(52) U.S. Cl.
CPC .............. *B08B 9/093* (2013.01); *B08B 13/00* (2013.01); *B28C 5/4203* (2013.01); *B60P 3/16* (2013.01); *B60S 1/62* (2013.01); *B60S 3/008* (2013.01)

(56) References Cited

U.S. PATENT DOCUMENTS

| | | |
|---|---|---|
| 6,155,277 A | 12/2000 | Barry |
| 6,866,047 B1 | 3/2005 | Marvin |
| 7,824,096 B2 | 11/2010 | Lindblom et al. |
| 8,911,138 B2 | 12/2014 | Cook et al. |
| 9,370,801 B1 * | 6/2016 | Short, Jr. ................ B01F 29/63 |
| 9,802,578 B2 * | 10/2017 | Beck, III ................. B28C 7/00 |
| 2002/0179119 A1 | 12/2002 | Harmon |
| 2007/0086270 A1 | 4/2007 | Harris et al. |
| 2008/0047587 A1 | 2/2008 | Ball |
| 2014/0198599 A1 | 7/2014 | Kamijo |
| 2015/0217344 A1 | 8/2015 | Tanaka |
| 2015/0217480 A1 * | 8/2015 | van der Wel .......... B60L 1/003 366/54 |
| 2018/0273000 A1 | 9/2018 | Beck et al. |

* cited by examiner

ONBOARD WASH SYSTEM

RELATED APPLICATIONS

This application is a continuation of U.S. patent application Ser. No. 15/874,588, filed on Jan. 18, 2018, now U.S. Pat. No. 10,899,318, which is related to and claims the benefit of previously filed U.S. Provisional Application 62/456,460, filed Feb. 8, 2017 and entitled "Onboard Wash System" and U.S. Provisional Application 62/501,927, filed May 5, 2017 and entitled "Onboard Wash System", the entirety of which are both incorporated herein by reference.

BACKGROUND

This application relates to mixing trucks traditionally used to carry concrete or ready mix (hereinafter "concrete"). More specifically, this application relates to an onboard washing system, which allows an operator to wash certain parts of the mixing truck after the concrete has been unloaded, while remaining on the ground. By having this system on the truck, there is no need for an operator/driver to climb ladders or other structures on the truck to carry out cleaning operations. This eliminates one possible source of injury, allows for removal of the ladder from the back of the truck, saves time for the operator, conserves water and saves/reduces weight.

Mixing trucks are widely used to transport and deliver concrete to construction or work sites. These trucks traditionally include a mixing drum, which is mounted on the rear of the truck in an angled manner to allow the mixing or stirring of cement, and discharge/delivery when desired. In operation, the truck is traditionally loaded in two different ways: (1) the mixing drum is loaded with dry materials, including dry concrete, aggregate material, and subsequently water is added, thus allowing the concrete to be mixed within the mixing drum, or (2) the drum is loaded with pre-mixed concrete at a ready-mix plant. In either case, the rotating operation of the mixing drum will mix materials, and/or will agitate/stir the concrete materials. The concrete is thus maintained in a non-hardened format until delivery/wash.

Once at the job site, the mixing drum reversed, causing the transported concrete to be discharged as desired. As is well recognized, this typically involves the concrete being fed from the drum opening, through a collection chute, and a delivery chute. The delivery chute is traditionally movable, and can be oriented or moved as desired to accommodate delivery.

Loading of the concrete truck, using either of the above-referenced methods involves the use of a charge hopper, which is traditionally mounted at the rear of the cement truck, adjacent the open end of the mixing drum. While the charge hopper can take on many shapes or forms, it is generally a funnel-like device, which will direct materials into the interior of the mixing drum.

As is also well known, the loading, mixing, and delivery of concrete is a messy process and allowing concrete to harden on or within the truck is very undesirable. Consequently, it is essential for the longevity of the equipment that concrete residue be washed or removed after the concrete has been delivered. If such residue is not removed, it quickly hardens and can cause all necessary equipment to operate inefficiently, adds weight, or cause many different equipment failures.

Traditionally, cleanout or washing operations are carried out by the operator shortly after the truck is filled or charged, and then again after delivery of the transported concrete. To accommodate cleaning, the truck will carry a water tank or water supply, and related hoses. Pressure is supplied to the water tank at a relatively low level, which allows water to be easily pumped into the clean-out hoses. After filling of the drum, the operator will usually climb an adjacent ladder (mounted at the rear of the truck) and use a hand-held spray nozzle to clean the charge hopper and various interior surfaces of the mixing drum. As the charge hopper and mixing drum are traditionally situated several feet off the ground, and have upwardly extending openings, the operator is required to climb ladders, or climb on the truck in some way, to reach the necessary locations. Some surfaces of the charge hopper and drum can be reached by spraying water while on the ground, but many of the critical surfaces cannot. Thus, climbing the back of the truck is the only way to access the portions of the change hopper and drum which need cleaning. After delivery it is necessary to wash the collection and delivery chutes. As will be anticipated, it is easier to wash these from the ground, but washing of some surface may require the operator to climb the ladder. For example, the interior surfaces of the collection chute can be challenging to access. Unfortunately, having operators climb on equipment and/or ladders creates an additional risk of harm or injury, which is clearly an undesirable circumstance. Consequently, any mechanisms or approaches that avoid having the operator climb on equipment is beneficial.

As mentioned, water tanks are traditionally carried on the truck itself. This water can be used for mixing operations, or any necessary re-wetting of concrete within the mixing drum. Additionally, the water can be used for the above-mentioned washout procedures or any other washing needs (e.g. cleaning of tools used during preparing or spreading concrete.) That said, it is desirable and efficient to carry water tanks which provide an optimum volume of water (enough water to carry out operations, without requiring excess or unnecessary capacity.) Obviously, unreasonably large water tanks increase weight and require space accommodations when designing the truck.

Based upon the above considerations, it would be desirable to provide a washing system which is easily capable of cleaning multiple surfaces in an efficient manner, without requiring an operator/driver to climb on ladders or related equipment.

BRIEF DESCRIPTION OF THE DRAWINGS

Further features of the various embodiments will be apparent from the following detailed description, in conjunction with the drawings, in which.

DESCRIPTION OF THE PREFERRED EMBODIMENTS

As set forth in the attached figures and the following discussion, an onboard washing system is mounted or fitted on a cement truck, and is capable of efficiently and effectively washing all necessary surfaces. Generally speaking, the system of one embodiment includes an appropriately sized water tank, strategically positioned nozzles, related piping or hoses and controls to perform washing operations as desired or necessary. As further detailed below, the system makes use of existing water tank pressure to efficiently and effectively complete washing operations. In an alternative embodiment, a high pressure hydraulic pump is added to produce higher water pressures.

In addition to those components or portions of the truck which are clearly dedicated towards concrete delivery (i.e., the discharge chute and delivery chutes), the wash system of the preferred embodiments is also capable of washing or cleaning the rearmost portions of the mixing drum. Traditionally, this will include portions of the fins within the mixing drum which are situated near the opening or edge. As recognized by those familiar with operations of a concrete truck, it is desirable to spray or wash these surfaces, including the outer edges of the drum, after concrete has been delivered. The ability to wash all of these surfaces is beneficial, and especially if this does not require mechanisms to be inserted into the drum itself. These surfaces may specifically include an outer lip of the mixing drum, and any portions of the mixing fins positioned adjacent the opening.

Figure 1:
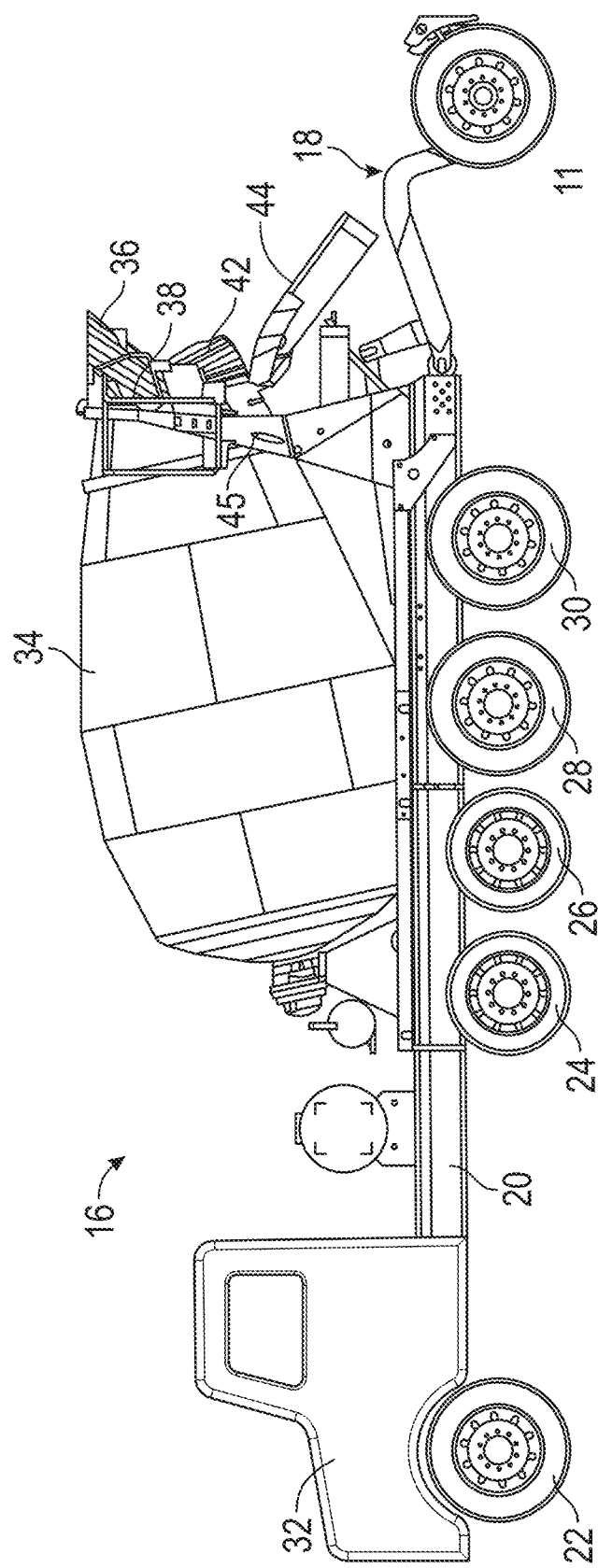
FIG. 1 as a side elevation of a concrete mixer truck.

Turning now to the drawings, FIG. 1 illustrates an example concrete mixer truck or vehicle 16. Vehicle 16 includes a main frame or chassis 20 supported by several wheel/axle assemblies including a forward assembly 22 (i.e. front wheel) for steering, and additional load bearing assemblies 24, 26, 28, and 30 (i.e. wheels). This particular embodiment also includes an auxiliary wheel 11, which is used to distribute weight loads. Components supported by the chassis include a cab 32, a mixing drum 34 supported to rotate relative to the chassis, and a charge hopper 36 located behind an upper opening 38 of drum 34. Charge hopper 36 is specifically configured to facilitate the loading of materials into drum 34. More specifically, charge hopper 36 and the rear portion of drum 34 are supported by a rear pedestal 45, which extends upwardly from chassis 20. As also illustrated, and further discussed below, several additional components are supported by rear pedestal 45.

In this particular embodiment, an auxiliary axle system 18 is included to help transfer and/or balance necessary loads. As also shown, mixing truck 16 includes a collection chute or collector 42 positioned below charge hopper 36, and a discharge chute 44 situated below collector 42. As is recognized, these components are configured and aligned to allow the delivery of concrete is a controlled and efficient manner.

Figure 2:
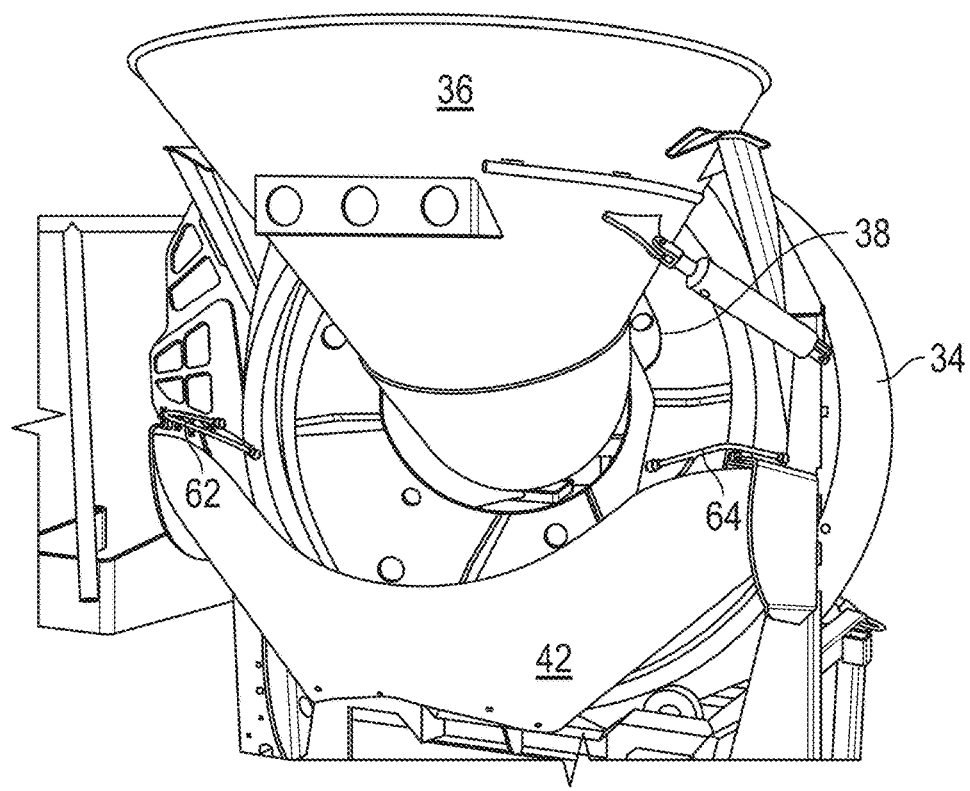
FIG. 2 is a rear view of an upper rear portion of the concrete mixer truck.

Referring now to FIG. 2, a close up perspective view of the rear portion of mixing drum 34 is illustrated. Adjacent upper opening 38 of drum 34 are both charge hopper 36 and collector 42. As recognized, these components traditionally become coated and dirty during the mixing/handling of concrete. In addition, upper opening 38 of mixing drum 34 also has various edge surfaces and exposed portions of various mixing fins 48, which are also in direct contact with concrete and can become dirty.

As better illustrated in FIG. 1, charge hopper 36 and collector 42 are supported by rear pedestal 45 and are positioned at a considerable height off the ground. While this provides efficiency when loading mixing truck 16, it also makes it difficult for an operator/driver to clean many surfaces of these components. To address this issue, the present onboard washing system includes a set of charge hopper nozzles 52, 54 and a set of collector nozzles 62, 64 to provide automated cleaning. As further discussed below and depicted in FIG. 5, charge hopper nozzles 52 and 54 are both positioned at an upper edge of charge hopper 36, and are specifically configured to produce a predetermined spray pattern. Similarly, collector nozzles 62 and 64 are positioned at an outer edge of collector 42, and are designed to produce a particular spray pattern. As will be anticipated, the spray pattern is specifically designed to cover certain areas and thus provide particular cleaning features. The particular nozzles themselves may be configured as a single nozzle, a collection of nozzles, a manifold type system producing a desired spray pattern, or other potential spray mechanisms.

Figure 5:
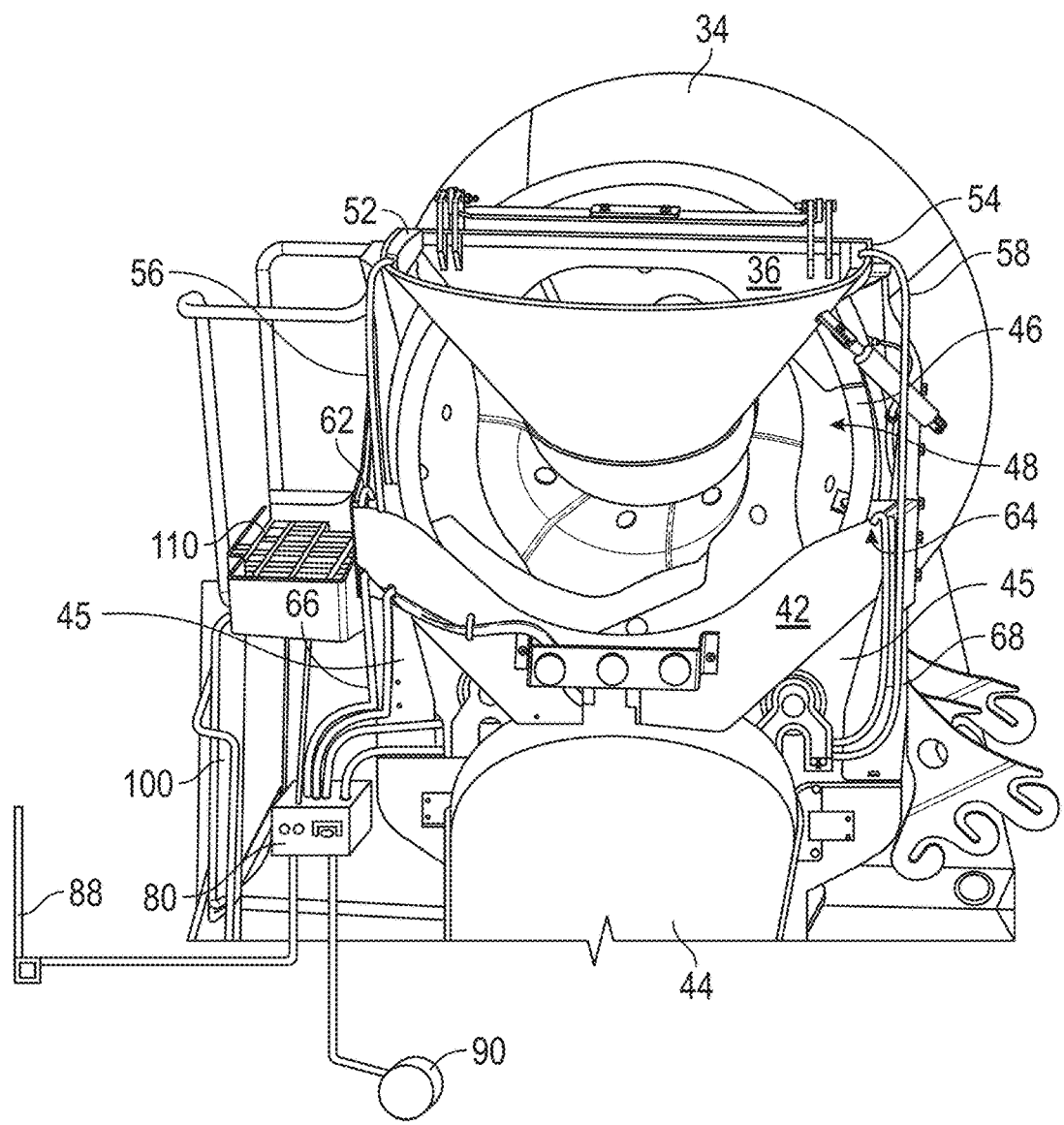
FIG. 5 is a partial upper rear perspective view of the truck.

The positioning of various spray nozzles 52, 54, 62, and 64 is generally illustrated in FIG. 5 which shows a partial upper rear view of vehicle 16. As anticipated, various supply lines 56, 58, 66, and 68 will connect all nozzles to a control block or control system 80. Control system 80 will include necessary valves, switches or controls to selectively provide water to the above identified nozzles. Control system 80 is also connected to a water or fluid supply 90 through appropriate pipes hoses or other connections. By making use of appropriate piping and nozzles, the air pressure system of the truck can be used to create water pressure needed to perform the contemplated washing operations. Naturally, the particular embodiment illustrated in FIG. 5 provides one approach for adapting a wash system to the concrete truck, but alternative configurations could also be utilized.

Also connected to control block 80 is a spray wand 88. As will be appreciated, spray wand 88 could be utilized by the operator to wash additional surfaces, such as lower portions of truck 16, outer surfaces of collector 42, outer surfaces of charge hopper 36, and/or portions of delivery chute 44.

As also illustrated in FIG. 5, this particular embodiment includes a platform 110 and a related ladder 100, both supported by portions of rear pedestal 45, which can be used by an operator to access upper portions of the vehicle 16. That said, the onboard washing system discussed above, including all specifically positioned nozzles and related components, will effectively eliminate the need for an operator to climb this ladder, or access upper portions of the truck. As such, ladder 100 and platform 110 could be eliminated.

As also mentioned above, nozzles 52, 54, 62, and 64 are specifically configured to spray washing fluid on particular locations. As will be anticipated, these locations include the interior of charge hopper 36, the interior portions of collector 42 and even interior portion or the opening of drum 34. In this manner, all elevated surfaces can be easily washed or cleaned by simply having an operator actuate appropriate controls on control block 80.

Figure 6:
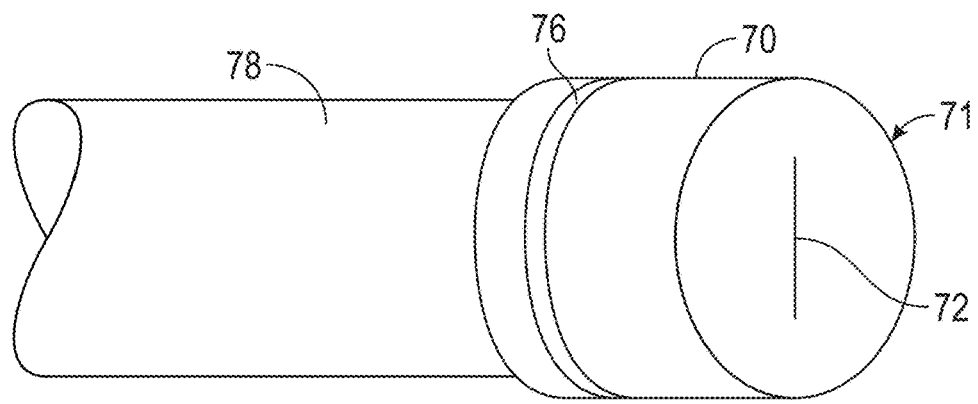
FIG. 6 illustrates one embodiment of a nozzle tip used in the wash system.

Although nozzles 52, 54, 62 and 64 have been generally mentioned above, it has been found that a flexible tip nozzle 70, as better illustrated in FIG. 6, may provide effective operation in the harsh environments involved. Multiple advantages are achieved using flexible tip nozzle 70, including the reduction of build-up and easy replacement. While it is contemplated that nozzles using flexible tip 70 will be efficient and effective, it is also possible that other nozzle tips could be used (e.g. a brass, steel or other material nozzle tip, which are all likely considered non-flexible). It is also contemplated that any combination of nozzle tips could be used to address the particular needs of a specific wash system. One embodiment of flexible tip nozzle 70 is illustrated in FIG. 6. In this embodiment, the flexible tip nozzle 70 is generally cylindrical and is made of a rubber material, although many different plastic or composite materials could be used. The end 71 has a slit 72 "cut" into an end thereof, to allow water to spray from the tip. By forming flexible tip nozzle 70 to have at least an end 71 made of a pliable material, this portion can "flex" thus allowing the material to move around slightly while being used. This will help prevent concrete buildup from accumulating and provides a self-cleaning characteristic. Installation is simple in that flexible tip nozzle 70 is pushed over an open water tube 78. To secure flexible tip nozzle 70, a clamp 76 can be used. Alternatively, a compression or interference fit could be used by appropriately configuring water tube 78 and the interior of flexible tip nozzle 70. Those skilled in the art will recognize that additional alternatives may be possible.

Figure 7A:
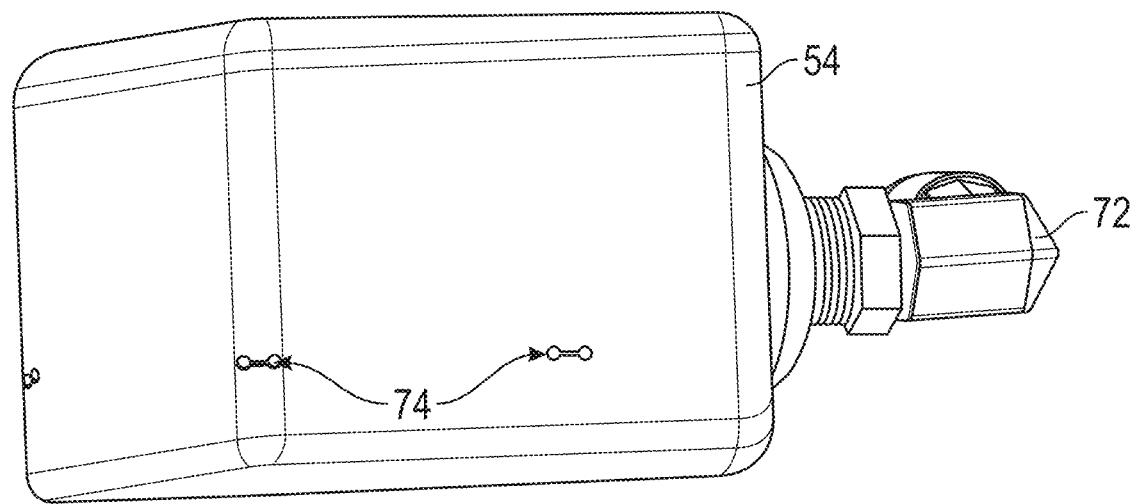
FIGS. 7A and 7B shows a front and bottom view of another embodiment of a spray nozzle used in the wash system.
Figure 7B:
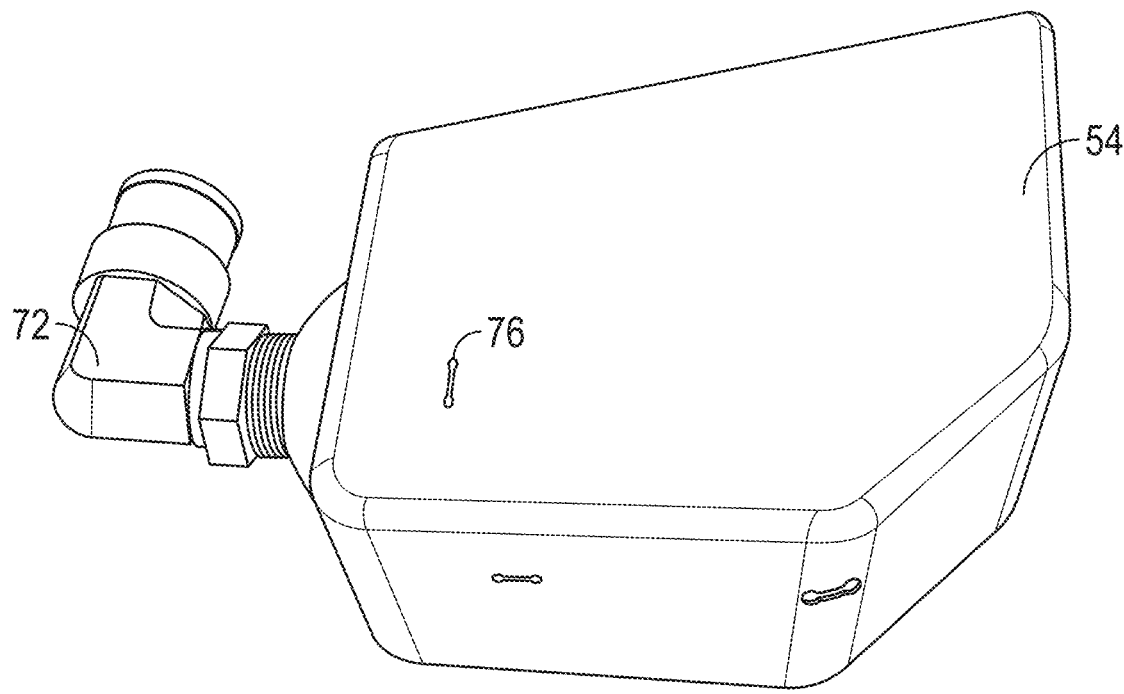

Again, nozzles 52, 54, 62, 64 can take on many different forms as generally discussed above. Referring now to FIGS. 7A and 7B, another embodiment of a nozzle is shown. In this particular embodiment, the nozzle structure 54, takes the form of a spray box, or spray structure capable of directing fluid as desired. FIG. 7A more specifically shows a front view of a spray nozzle 54, while FIG. 7B illustrates a bottom view of this same structure. As will be appreciated, this particular embodiment involves an enclosed compartment (not shown), which is fluidly coupled to a connector 72. Although not shown, it is anticipated that nozzle 52, as generally shown in FIG. 5, could be similarly configured. It is also contemplated that connector 72 will be easily attached to cooperating fluid supply line 58 (see, FIG. 5). As shown in FIGS. 7A and 7B, nozzle 54 will include a number of spray openings 74, along with a drain opening 76. Although not shown in the installed orientation, it will be recognized and understood that, in use, drain hole 76 will be on a bottom side of nozzle 54, while spray openings 74 will be on a vertical surface or side thereof In this way, fluid forced into the internal compartment can be expelled in outward and downward directions, thus promoting the washing operations as desired. In addition, since drain hole 76 is positioned on a bottom surface, any fluid contained within the internal chamber can easily be drained, thus avoiding excessive fluid buildup. In certain situations, a drain hole 76 can be configured as an additional spray opening, thus providing additional spray coverage.

Figure 8:
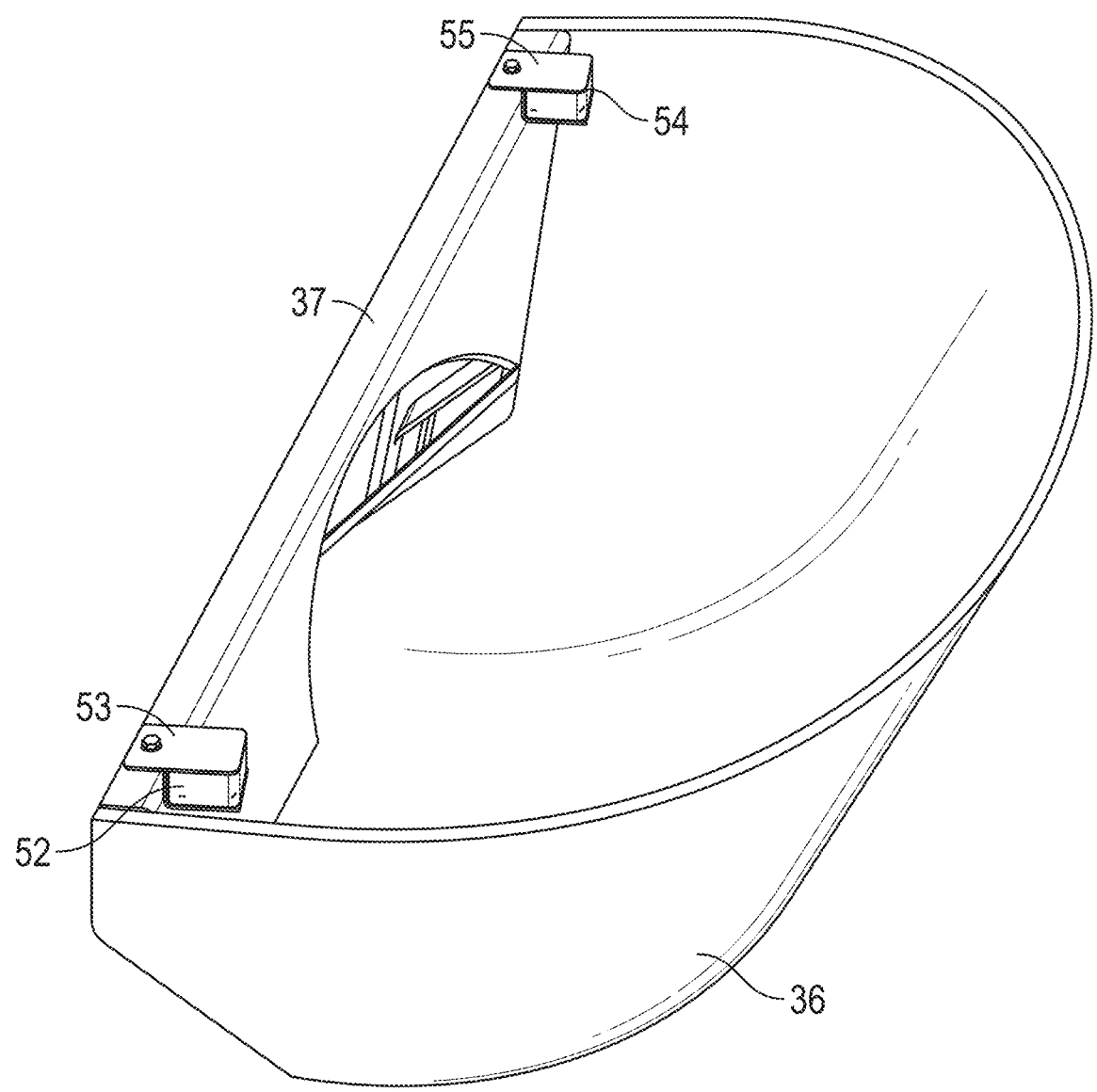
FIG. 8 is a top view of the spray nozzles illustrated in FIGS. 7A, and 7B as installed on a charge hopper.

The embodiment shown in FIGS. 7A and 7B simply illustrates another variation of nozzle structure 54. This embodiment is advantageous since the overall configuration can be custom designed so it cooperates or fits with particular structures on truck or vehicle 16. For example, the embodiment illustrated in FIGS. 7A and 7B is easily coupled to charge hopper 36, and can be placed in corners so that interference is minimized. (This positioning is best shown in FIGS. 5 and 8.) Those skilled in the art will recognize that variations are possible depending on mounting and spray requirements involved.

Turning now to FIG. 8, charge hopper 36 is illustrated alone to better show application of two particular nozzles. As shown, charge hopper nozzle 52 and charge hopper nozzle 54 are attached to an upper edge 37 of charge hopper 36. As will be understood and recognized, supply lines can be fitted behind these nozzles, and are used to appropriately supply water, or other cleaning fluids. These supply lines are routed through various structures on vehicle 16 in a manner to avoid interference with other components or systems. The isolated view of FIG. 8 does not allow for the display of these supply line components. As shown, a plate structure 53 is utilized to allow attachment of nozzle 52. Similarly, a second plate structure 55 is utilized to allow easy attachment of nozzle 54. These components may be included as an integral part of the nozzle, or could be separate mounting components. Naturally, other connection methodologies could be utilized, however, using plate structures 53 and 55 along with common mounting bolts provides considerable convenience and the ability to replace nozzles 52 and 54, when necessary.

Figure 3:
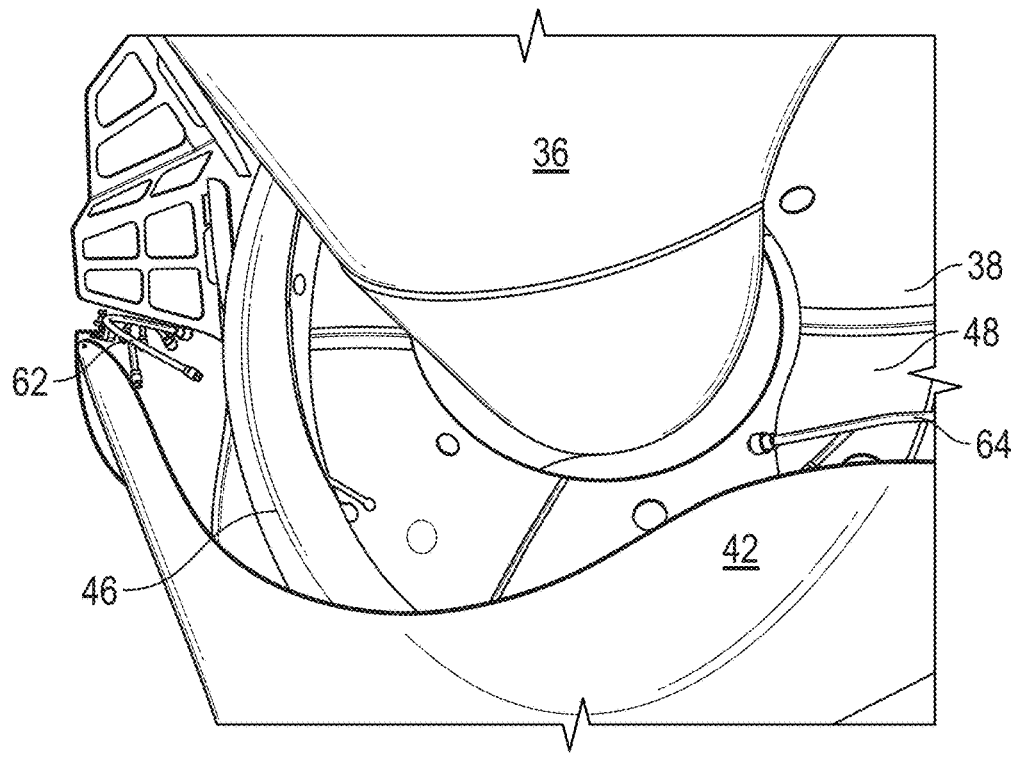
FIG. 3 is a close-up view of the drum opening area, showing portions of the collector, charge hopper and mixing drum.
Figure 4:
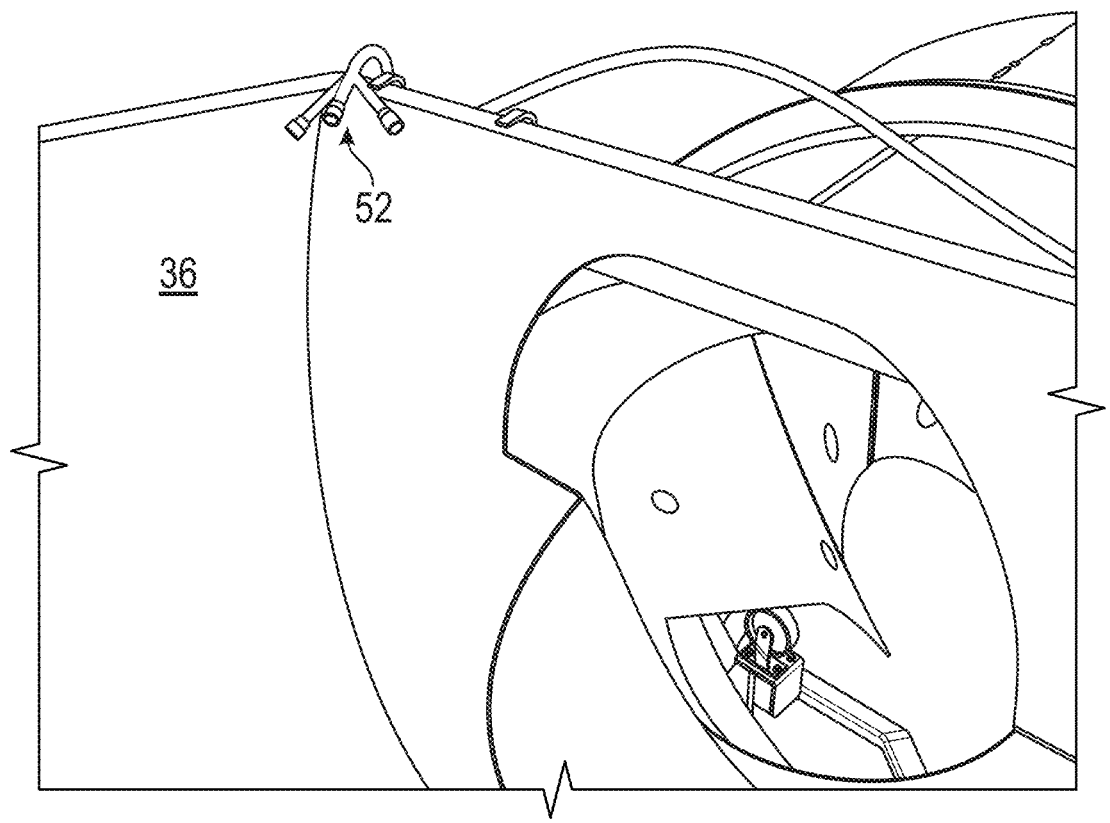
FIG. 4 is an upper perspective view of a portion of the charge hopper.
Figure 9:
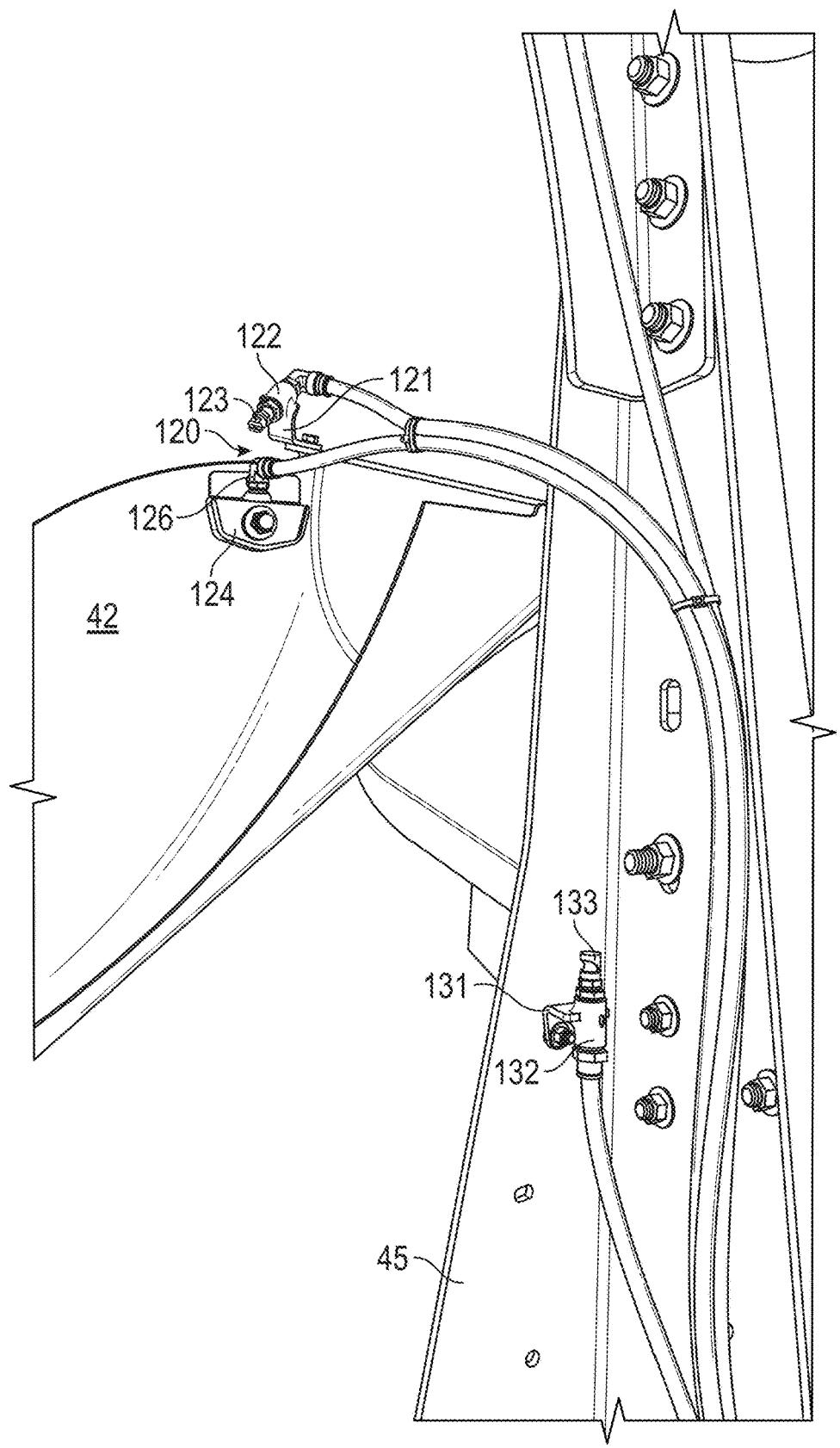
FIG. 9 illustrates spray nozzles positioned to clean portions of the drum.

As mentioned above, collector nozzles 62 and 64 (as shown in FIGS. 2 and 3) are utilized for cleaning/treatment of collector 42. Illustrated in FIG. 9 is an alternative embodiment using slightly different nozzles. As shown, this embodiment involves the replacement of nozzle assembly 62 (as discussed above and shown in FIG. 3) with a nozzle pair 120. As more specifically shown in FIG. 9, nozzle pair 120 is specifically situated to provide cleaning of collector 42 and optionally, cleaning of other adjacent surfaces. In this particular embodiment, nozzle pair 120 includes a targeted spray nozzle 122 and a box nozzle 124. As will be recognized, targeted spray nozzle 122 includes a tip 123 which is specifically configured to direct fluid at a desired location. Box nozzle 124 is configured somewhat similar to nozzle 54 discussed above and illustrated in FIGS. 7A and 7B. More specifically, box nozzle 124 will include a fluid inlet 126, an internal chamber 128 (not shown) and a plurality of outlet openings 130 positioned on a bottom side. Although, internal chamber 128 and outlet openings 130 are not illustrated in FIG. 9, those skilled in the art will recognize that box nozzle 124 is formed as an enclosed housing with an internal chamber capable of containing fluid, and can include a number of outlet openings 130 positioned on "a bottom side" of the housing. (Based upon the orientation shown in FIG. 9 the bottom side and related outlet openings 130 are not shown.) As recognizes, outlet openings 130 will permit fluid to be delivered or sprayed to appropriate locations on collector 42. In one embodiment, a second nozzle pair 120 will be positioned or placed on the opposite side of collector 42, thus providing cleaning operations from both sides.

In the embodiment illustrated in FIG. 9, targeted spray nozzle 122 is attached to an upper edge of collector 42 using a connection bracket 121. The configuration of connection bracket 121 specifically allows positioning of targeted nozzle 122 to produce a desired effect. In this case, targeted spray nozzle 122 can be oriented to assist with cleaning of collector 42, or other surfaces. As mentioned above, collector 42 is positioned adjacent to and below drum 34. In many situations it is beneficial to provide cleaning assistance to an edge portion of drum 34. Targeted spray nozzle 122 is capable of providing this capability. More specifically, bracket 121 allows positioning and alignment of targeted spray nozzle 122 so that portions of the fluid stream are directed towards the edges surrounding the opening to drum 34. In this manner, cleaning of these surfaces is thus provided.

In a similar manner, the embodiment illustrated in FIG. 9 also provides the ability to clean or wash an outer portion of drum 34. As shown in FIG. 9, a second spray nozzle 132 is utilized as part of the system. A second connection bracket 131 is utilized to connect second spray nozzle 132 to a rear pedestal 45 of vehicle 16. Again, rear pedestal 45 exists to provide support for drum 34, and several other components. Rear pedestal 45 also specifically accommodates the placement of second spray nozzle 132, as illustrated in FIG. 9. In this embodiment, second spray nozzle 132 includes a spray tip 133, again configured to provide a controlled spraying of fluid as desired. In particular, second spray nozzle 132 is configured and designed to produce a spray of washing fluid directed toward an outer edge of drum 34. In this embodiment, second spray nozzle 132 is positioned slightly below drum 34, thus allowing spraying and washing of outer surfaces from a bottom side location. Again, it is contemplated that a similar spray nozzle could be positioned on an opposite side, thus providing washing capabilities to both sides of drum 34. That said, since drum 34 rotates this additional nozzle may not be necessary or applicable in all situations.

As generally discussed above, the washing system utilizes water carried by an onboard fluid tank 90. In certain occasions the tank pressure is utilized, without additional pump. As such, the overall control of fluid within the washing system is necessary and desired. To achieve this, the washing system is divided into a number of different zones or components, each designed to wash a particular area. For example, one zone may provide washing fluid only to charge hopper nozzles 54 and 56, while another zone will provide washing fluid to a set of collector nozzles. To accomplish this control, a number of controlled valves are utilized.

Figure 10:
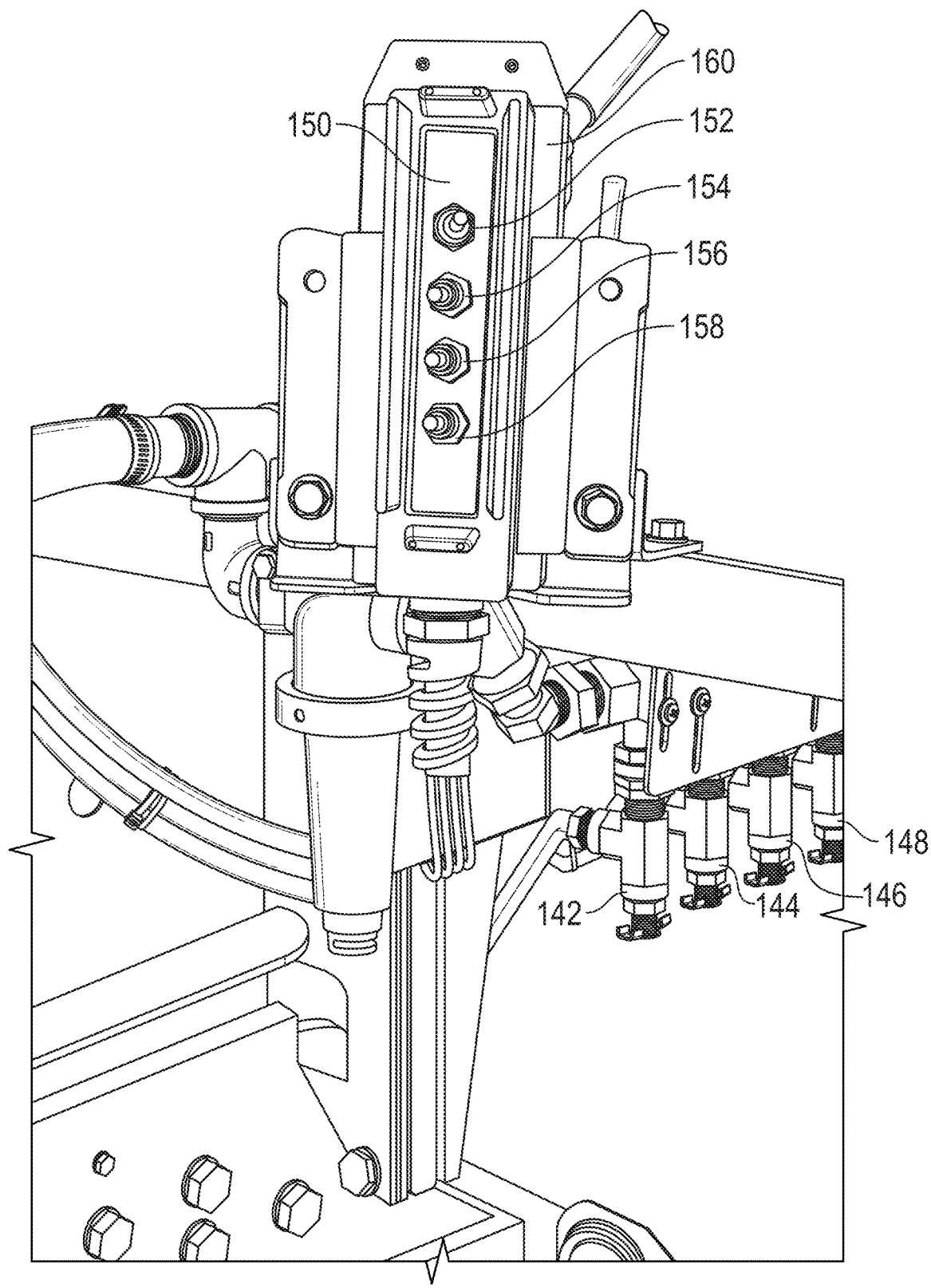
FIG. 10 shows a control module for operating the wash system.

Referring now to FIG. 10, a rear pedestal wash controller 150 is better illustrated. Rear pedestal wash controller 150 will be utilized to control washing operations on the vehicle 16, and specifically controls a number of controlled valves (142, 144, 146, 148). Each of these valves have outputs supplied to particular nozzles or nozzle sets to achieve desired washing operations. To control each of these valves, wash controller 150 includes a set of control switches 152, 154, 156 and 158. Each control switch is specifically configured and wired to control one related valve, thus provide the ability to control fluid to any one of the above-mentioned zones.

Again, the current wash system makes use of the onboard fluid tank, thus some consideration of water conservation is required. To allow for the responsible control of fluid flow, each switch (152, 154, 156 and 158) includes a timed auto shutoff mechanism. More specifically, once switched on, the related valve is controlled so that fluid is supplied for only a short controlled minute of time, and then automatically shut off. Thus, an operator is simply required to activate a necessary switch (e.g., switch 152), resulting in spray washing of the related zone for a controlled amount of time. The operator is then able to walk away and attend to other tasks, knowing that the water supply will be stopped after a period of time, thus conserving the limited amount of water carried by vehicle 16. In addition, wash controller 150 can be also removed from its supporting bracket 160, thus providing even more flexibility for the operator. Related control lines, and other components are provided which accommodates this detachability and allows an operator to attend to other details or functions.

Although not specifically illustrated above, an additional nozzle or set of nozzles could be supplied which are directed toward washing of the delivery chute 44. This would be positioned below collector, and oriented in a manner to provide washing water to the inner surface, thus providing the ability to clean this component as well.

As suggested above, alternative embodiments could include a hydraulic high pressure pump to provide washing fluid. Clearly the hydraulic pump would provide the system with higher pressure levels for the wash fluid, to accommodate those situations where higher pressure is needed. That said, the addition of a pump does add cost and provides an additional system for the truck which may not be desired.

Although the wash system described above is installed on a concrete mixing truck, it should also be recognized that other alternative applications may exist. Particularly, it may be appropriate to mount a similar system to a refuse hauling truck (i.e. garbage truck), dump truck, or other vehicles.

Various embodiments of the invention have been described above for purposes of illustrating the details thereof and to enable one of ordinary skill in the art to make and use the invention. The details and features of the disclosed embodiments are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

The invention claimed is:

1. An efficient washing system for cleaning multiple surfaces of a concrete mixer truck, the concrete mixer truck operable to be driven upon various surfaces including a wash location, the system comprising:
   a water supply carried by the concrete mixer truck;
   a water distribution system having a plurality of hoses and related manifold devices;
   a plurality of spray nozzles mounted on the concrete mixer truck, each nozzle positioned in a predetermined orientation and mounted at predetermined locations upon the concrete mixer truck, wherein the predetermined orientation and the predetermined locations cause a spray pattern generated by the plurality of nozzles to cover a plurality of wash areas on a rear portion of the concrete mixer truck, wherein the plurality of wash areas comprise an outer surface of a mixing drum, an inner surface of the mixing drum and a portion of the collector; and
   a control system operatively coupled to the water distribution system to control the supply of water to the plurality of spray nozzles so that water is selectively provided to the plurality of nozzles, the control system accessible by a user who is situated upon the surface of the wash location and is not required to climb on any portion of the concrete mixer truck.

2. The washing system of claim 1 wherein the plurality of nozzles comprise a set of collector nozzles, and a set of drum nozzles, wherein the set of drum nozzles are configured to spray water at both the outer surface of the mixing drum and the inner surface of the mixing drum.

3. The washing system of claim 2 wherein the plurality of nozzles are grouped into zones, with each zone including at least one nozzle, and wherein the control system is configured to independently control each of the zones.

4. The washing system of claim 3 wherein the control system further comprises a plurality of control switches, with each switch configured to control a single zone, and each switch having timing capabilities so that the flow of water to the related zone is stopped after a predetermined period of time.

5. The washing system of claim 1 wherein any one of the plurality of spray nozzles comprise a box nozzle having an enclosed chamber, a fluid supply inlet, and at least one spray opening, wherein the box nozzle is mounted on the vehicle is an orientation such that the spray opening is directed toward a desired one of the wash areas.

6. The washing system of claim 1 wherein the plurality of spray nozzles comprise removable flexible tips formed from a material having a predetermined level of flexibility so as to avoid build-up on a spraying surface thereof.

7. The washing system of claim 1 further comprising spray wand operable by a user, wherein water supplied to the spray wand is controlled by the control system.

8. The washing system of claim 7 wherein the control system is configured to have a manually operable valve configured to control the water supplied to the spray wand.

9. The washing system of claim 2 further comprising a set of charge hopper nozzles which are coupled to an upper edge of the charge hopper and are configured to spray water on the inner surfaces of the charge hopper.

10. The washing system of claim 2 wherein the set of collector nozzles are coupled to an upper edge of the collector and are configured to spray water on the inner surfaces of the collector.

11. The washing system of claim 9 wherein the set of charge hopper nozzles comprise box nozzle having an enclosed chamber, a fluid supply inlet, and at least one spray opening, wherein the spray opening is directed toward the inner surface of the charge hopper.

12. A wash system for use on a concrete mixer truck having drum, a charge hopper, a collector, and a delivery chute, the wash system comprising:

a water supply carried by the concrete mixer truck;

a plurality of spray nozzles mounted on the concrete mixer truck at a plurality of predetermined locations, wherein the predetermined locations cause a spray pattern generated by the plurality of nozzles to cover a plurality of wash areas, the plurality of nozzles comprising, a set of collector nozzles coupled to the collector and configured to provide a washing spray to an inner surface of the collector, and a set of drum nozzles coupled to a portion of the concrete mixer truck and positioned to be adjacent the drum so as to provide a washing spray to an inner surface of the drum and an outer surface of the drum;

a water distribution system having a plurality of hoses and related manifold devices configured to supply water from the tank to the plurality of spray nozzles; and a control system coupled to the water distribution system to control the supply of water to the plurality of spray nozzles so that water is selectively provided to the plurality of nozzles, the control system positioned at the rear portion of the concrete mixer truck and accessible by a user from a ground surface and without the need for the user to climb on any portion of the concrete mixer truck, the control system further comprises a plurality of control switches, with a first switch configured to control the collector nozzles, and a second switch configured to control the drum nozzles, and wherein each switch is manually operable and positioned to be operated by a user while still on the ground.

13. The wash system of claim 12 further comprising a delivery chute nozzle positioned adjacent the delivery chute and configured to provide a washing spray to an inner surface of the delivery chute, the delivery chute nozzle coupled to the water distribution system and controlled by the control system.

14. The wash system of claim 12 wherein at least one of the plurality of nozzles comprises a box nozzle having an enclosed chamber, a fluid supply inlet, and at least one spray opening, wherein the box nozzle is mounted on an upper portion of the charge hopper and is positioned in an orientation such that the spray openings are directed toward the inner surface of the charge hopper.

* * * * *